(12) United States Patent
Chen et al.

(10) Patent No.: US 6,781,842 B2
(45) Date of Patent: Aug. 24, 2004

(54) COMPUTER ENCLOSURE WITH DRIVE BRACKET

(75) Inventors: Yun-Lung Chen, Tu-Chen (TW); Jung-Chi Chen, Tu-Chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 86 days.

(21) Appl. No.: 10/137,777

(22) Filed: May 1, 2002

(65) Prior Publication Data

US 2003/0161098 A1 Aug. 28, 2003

(30) Foreign Application Priority Data

Mar. 6, 2002 (TW) ....................................... 91202524 U

(51) Int. Cl.[7] ............................................... H05K 7/16
(52) U.S. Cl. .................... 361/725; 361/635; 312/223.3; 248/60
(58) Field of Search ................................ 361/720–727, 361/683–687, 609, 611, 615, 634–635; 312/223.1–223.6; 248/60, 581, 609, 611, 615, 634–635

(56) References Cited

U.S. PATENT DOCUMENTS 5,552,957 A * 9/1996 Brown et al. ............... 361/683

6,317,318 B1 * 11/2001 Kim ........................... 361/685

FOREIGN PATENT DOCUMENTS

TW              435933    * 11/2001

* cited by examiner

Primary Examiner—Hung V. Duong
(74) Attorney, Agent, or Firm—Wei Te Chung

(57) ABSTRACT

A computer enclosure includes a hood (30), a bracket (10) attached to the hood, and a base (60). The bracket includes a connective portion (12), and two frames (14, 16) connected with opposite sides of the connective portion. Two L-shaped openings (18a) and an aperture (20a) are defined in the connective portion. A distal edge of each frame is bent outwardly to form a flange (22). An L-shaped opening (18b) and an aperture (20b) are defined in each flange. Three parallel beams (32a, 32b) are formed from a top plate (31) of the hood. The beams form a plurality of latches (36b) engagingly received in the openings of the bracket. A plurality of posts (34a, 34b) is formed at the beams, corresponding to the apertures. A plurality of screws (50) extends through the apertures and is threadedly engaged in the posts. The bracket is thereby locked on the hood.

15 Claims, 3 Drawing Sheets

COMPUTER ENCLOSURE WITH DRIVE BRACKET

BACKGROUND OF THE INVENTION

1. Field of the Invention

The present invention relates to computer enclosures, and particularly to computer enclosures having drive brackets.

2. Related Art

Various data storage devices are installed in computers for electronic communication and handling of data. Drive brackets are often used to support and secure such data storage devices inside the computers.

A typical computer is disclosed in Taiwan Patent No. 435933. The data storage devices comprise a floppy disk drive and a CD-ROM drive respectively provided in a bracket, and the bracket is mounted in the computer enclosure with a multiplicity of screws. Taiwan Patent Application No. 394498 discloses another conventional bracket for accommodating data storage devices. A plurality of modularized brackets respectively receive a plurality of data storage devices by way of screw attachment. The combined brackets and data storage devices are then respectively slide-mounted into a housing of the computer enclosure.

However, using screws to mount a bracket in a computer enclosure is laborious and time-consuming. In addition, when a user wants to modify or maintain a component in the computer, removal of the screws is inconvenient. Similarly, using screws to attach a data storage device to a modularized bracket is laborious and time-consuming. Moreover, production and assembly of the modularized brackets is complicated and costly.

SUMMARY OF THE INVENTION

Accordingly, an object of the present invention is to provide a computer enclosure having a bracket which readily and securely accommodates data storage devices therein.

To achieve the above-mentioned object, a computer enclosure in accordance with the present invention comprises a hood, a bracket attached to the hood, and a base. The bracket includes a connective portion, and two frames respectively connected with opposite sides of the connective portion. Two L-shaped openings and an aperture are defined in the connective portion. A distal edge of each frame is bent outwardly to form a flange. An L-shaped opening and an aperture are defined in each flange. Three parallel beams are formed from a top plate of the hood. The beams form a plurality of latches engagingly received in the openings of the bracket. A plurality of posts is formed at the beams, corresponding to the apertures of the bracket. A plurality of screws extends through the apertures and is threadedly engaged in the posts. The bracket is thereby locked on the hood.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
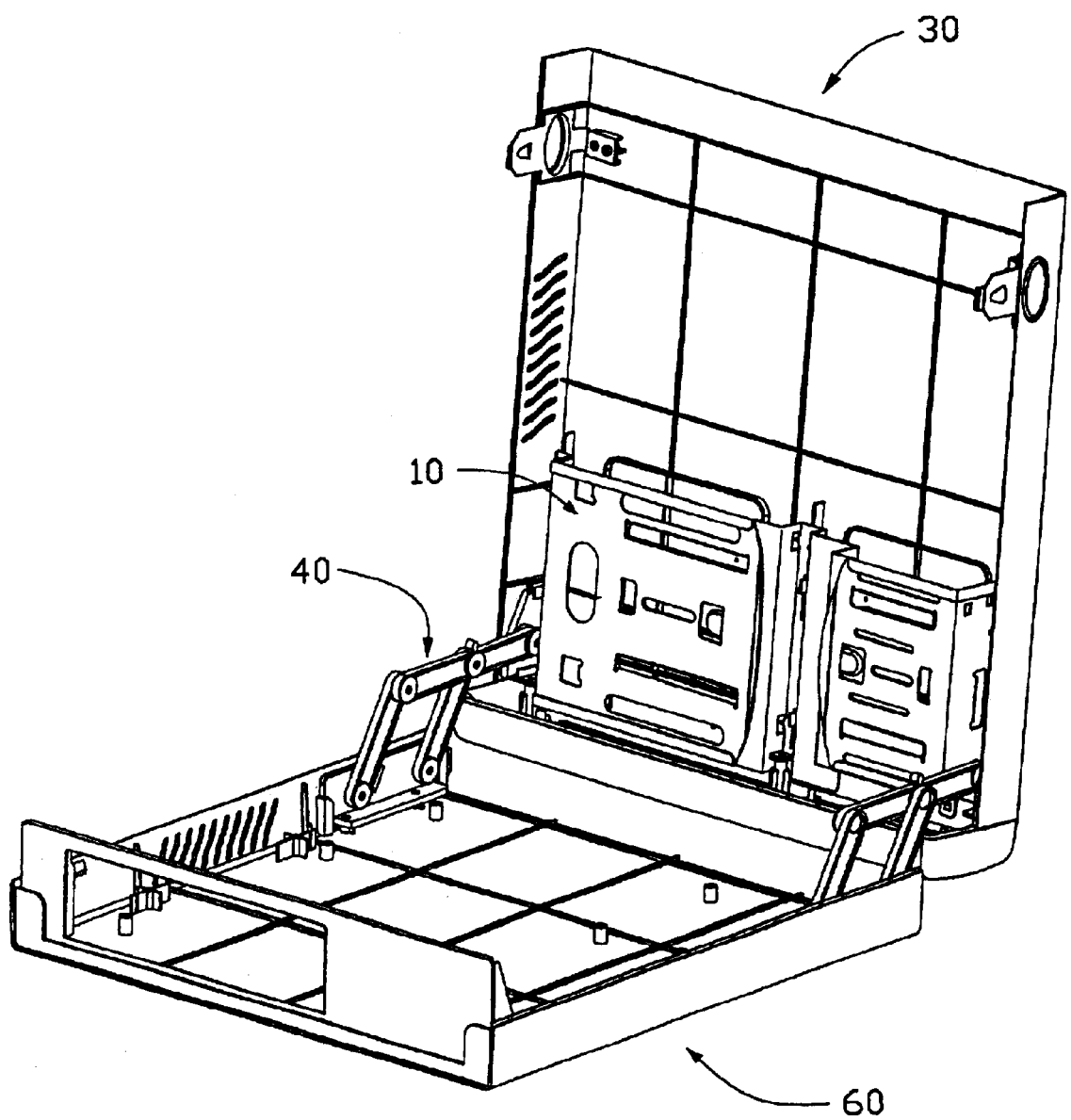
FIG. 1 is a perspective view of a computer enclosure in accordance with the present invention.

Referring to FIG. 1, a computer enclosure in accordance with the present invention comprises a hood 30, a bracket 10 attached to the hood 30, and a base 60. The hood 30 is connected with the base 60 by a pair of connecting rod mechanisms 40, so that the hood 30 is pivotal about the base 60.

Figure 2:
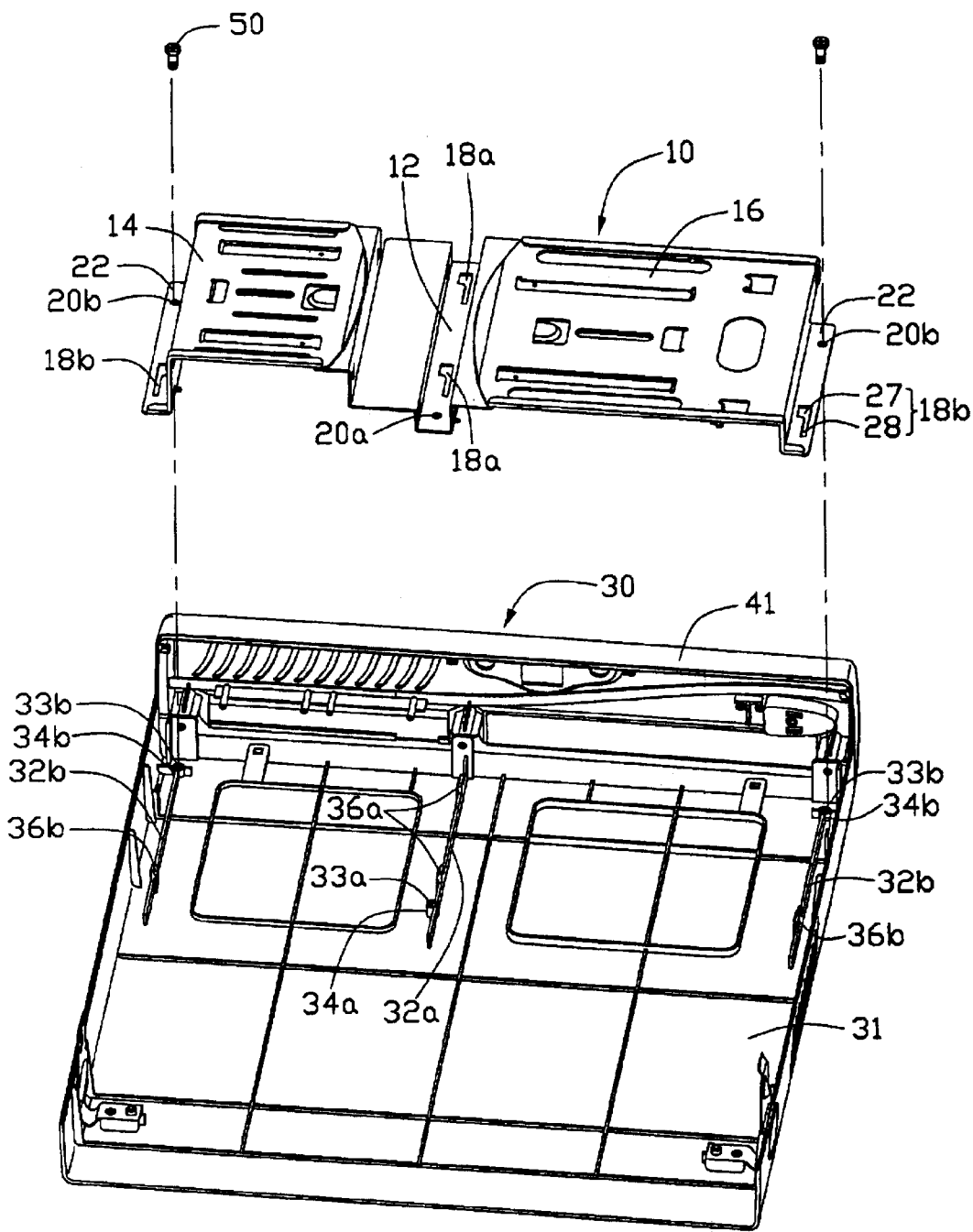
FIG. 2 is an exploded perspective view of a hood of the enclosure of FIG. 1.

Referring to FIG. 2, the bracket 10 comprises a central connective portion 12, and two frames 14, 16 at opposite sides of the connective portion 12 respectively. Two spaced L-shaped openings 18a are defined in the connective portion 12. An aperture 20a is defined in the connective portion 12, between one of the openings 18a and a proximate edge of the connective portion 12. The frames 14, 16 are used to accommodate data storage devices such as a floppy disk drive and a CD-ROM device. A distal edge of each frame 14, 16 is bent outwardly to form a flange 22. An L-shaped opening 18b and an aperture 20b are defined in each flange 22. Each L-shaped opening 18a, 18b comprises a wide slot 27 and a narrow slot 28.

The hood 30 comprises a top plate 31, and a bezel 41 fixed to the top plate 31. A beam 32a is inwardly formed from the top plate 31 near the bezel 41. The beam 32a is disposed generally intermediate opposite lateral sides of the top plate 31, and perpendicular to the bezel 41. A pair of spaced and hook-shaped latches 36a is formed from the beam 32a. A post 34a is integrally formed with the beam 32a near an inmost end thereof. A screw hole 33a is defined in the post 34a. The latches 36a correspond to the openings 18a of the bracket 10. A pair of beams 32b is inwardly formed from the top plate 31 near the opposite lateral sides of the top plate 31 respectively, and parallel to the beam 32a. A hook-shaped latch 36b is formed from each beam 32b proximate an inmost end thereof. A post 34b is integrally formed with each beam 32b near the bezel 41. A screw hole 33b is defined in each post 34b. The latches 36b correspond to the openings 18b of the bracket 10. The posts 34b correspond to the apertures 20b of the bracket 10. Three screws 50 (only two shown) are used to lock the hood 30 to the bracket 10.

Figure 3:
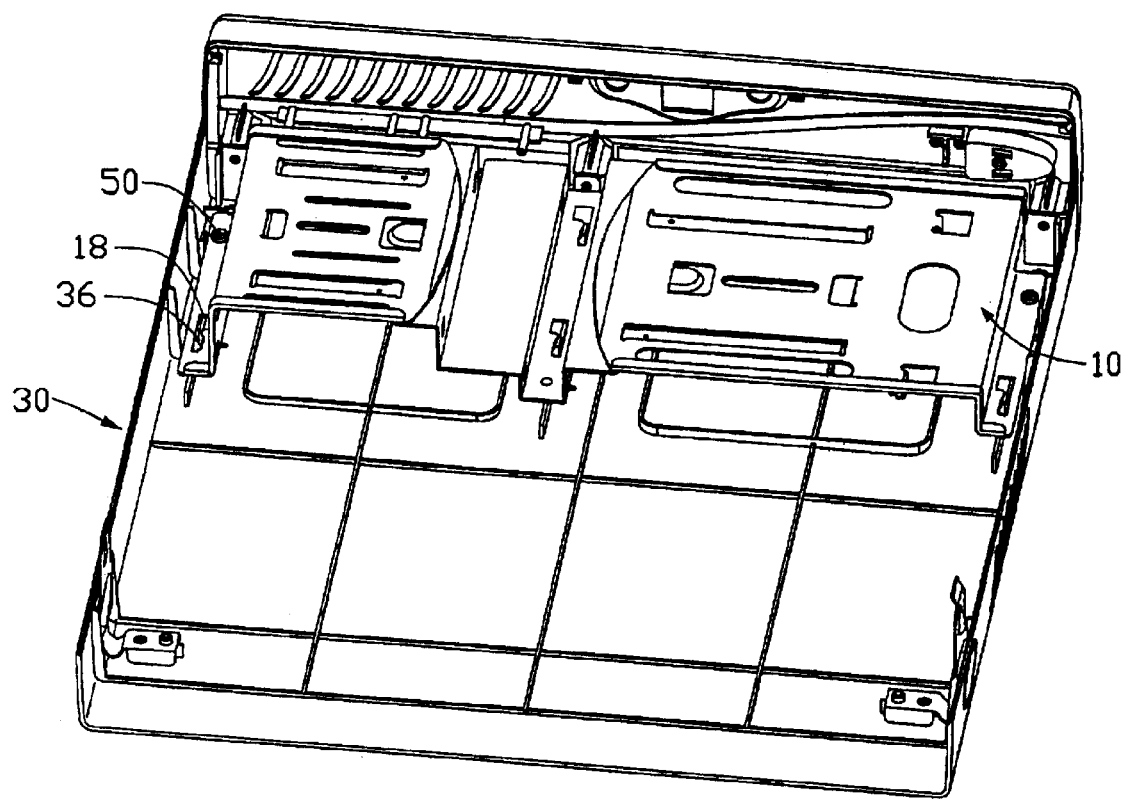
FIG. 3 is an assembled view of FIG. 2.

Referring also to FIG. 3, in assembly, the frames 14, 16 are connected with the opposite sides of the connective portion 12 by conventional means. The latches 36a, 36b of the hood 30 are inserted into the wide slots 27 of the openings 18a, 18b of the bracket 10 in a first direction perpendicular to the hood 30. The bracket 10 is pushed in a second direction parallel with the hood 30 until the latches 36a, 36b reach ends of the narrow slots 28 of the openings 18a, 18b. The hook shape of the latches 36a, 36b ensure that the bracket 10 is thereby fixed on the hood 30. The screws 50 are inserted through the apertures 20a, 20b of the bracket 10 and threadedly engaged in the screw holes 33a, 33b of the hood 30. Finally, the hood 30 is connected with the base 60 by the connecting rod mechanisms 40, so that the hood 30 is pivotal about the base 60.

In the computer enclosure of the present invention, data storage devices are easily installed into or removed from the bracket 10. Checking, maintenance and replacement of the data storage devices is quick and convenient.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a bracket comprising a connective portion and two frames at opposite sides of the connective portion, the connective portion defining at least one opening, each of the frames forming a flange distal from the connective portion, each of the flanges defining at least one opening, wherein each of the openings of the connective portion and the frames is generally L-shaped, and comprises a wide slot and a narrow slot; and a hood comprising a top plate, the top plate forming a plurality of latches received in the openings of the connective portion and the frames and engaged with the bracket.

2. The computer enclosure as claimed in claim 1, wherein two openings are defined in the connective portion.

3. The computer enclosure as claimed in claim 1, wherein the top plate of the hood is provided with a first beam supporting the connective portion of the bracket.

4. The computer enclosure as claimed in claim 3, wherein the first beam forms two latches thereon, a post is formed at the first beam, a screw hole is defined in the post, an aperture is defined in the connective portion, and a screw is extended through the aperture and threadedly engaged in the screw hole.

5. The computer enclosure as claimed in claim 4, wherein the top plate of the hood is provided with a pair of second beams supporting the flanges of the bracket.

6. The computer enclosure as claimed in claim 5, wherein each of the second beams forms one latch thereon, a post is formed at each of the second beams, a screw hole is defined in the post, an aperture is defined in each of the flanges of the bracket, and a pair of screws extends through the apertures and threadedly engages in the screw holes.

7. The computer enclosure as claimed in claim 6, wherein the latches of the hood engaged with the bracket and the screws extended through the apertures and threadedly engaged in the screw holes cooperatively fix the bracket to the hood.

8. A computer enclosure comprising:

a base;

a hood pivotably connected to the base; and a bracket moved to the hood in a first direction perpendicular to the hood and then slid along the hood in a second direction substantially perpendicular to the first direction thereby fixing the bracket to the hood.

9. The computer enclosure as claimed in claim 8, wherein the hood is mounted to the base with at least one connecting rod mechanism.

10. The computer enclosure as claimed in claim 8, wherein the bracket comprising two frames and a connective portion connected between the two frames, and the hood forms a first beam supporting the connective portion of the bracket.

11. The computer enclosure as claimed in claim 10, wherein the connective portion defines at least one opening, and the first beam forms at least one latch thereon received in the at least one opening and engaged with the connective portion.

12. The computer enclosure as claimed in claim 11, wherein each of the frames forms an outer flange, and the hood forms a pair of second beams each supporting a respective one of the outer flanges.

13. The computer enclosure as claimed in claim 12, wherein each of the flanges defines at least one opening, and each of the second beams forms at least one latch thereon received in the at least one opening and engaged with the flange.

14. The computer enclosure as claimed in claim 13, wherein each of the openings of the bracket is generally L-shaped, and comprises a wide slot and a narrow slot in communication with each other.

15. A computer enclosure comprising:

a base including a bottom plate, a rear plate and two opposite side plates;

a hood including a top plate and a front plate, and pivotally connected to the base around said front plate, said front plate defining apertures extending therethrough in a front-to-back direction; and a bracket fixedly attached to an underside of said top plate and associated with said top plate to pivotally move relative to the base, said bracket cooperating with said top plate to define cavities in alignment with said corresponding apertures, respectively, for receiving data storage devices therein.

* * * * *